UNITED STATES PATENT OFFICE.

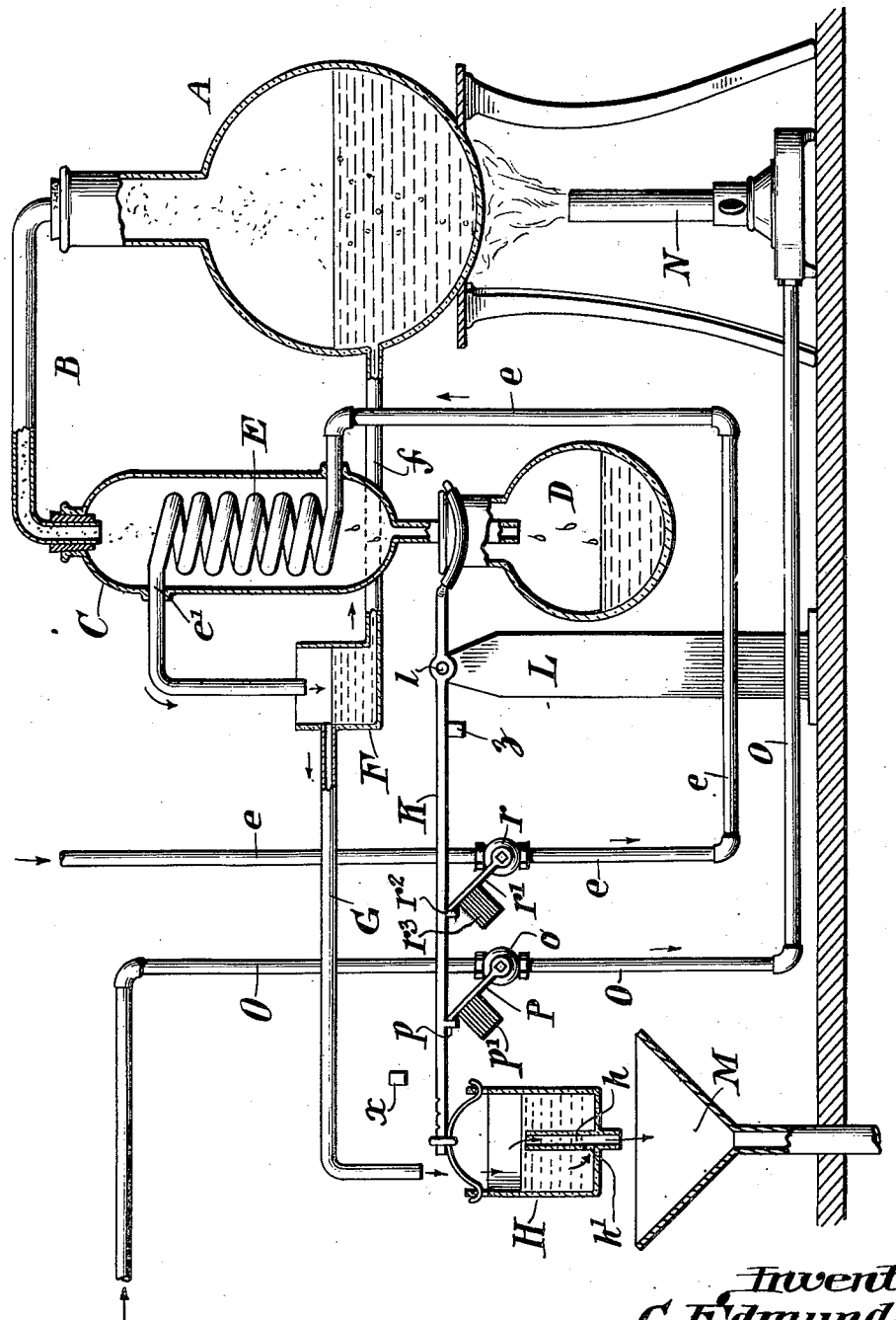

CHARLES EDMUND KELLS, OF NEW ORLEANS, LOUISIANA.

WATER-DISTILLING APPARATUS.

1,404,971.  Specification of Letters Patent.  Patented Jan. 31, 1922.

Application filed August 14, 1920, Serial No. 403,467. Renewed May 5, 1921. Serial No. 467,124.

*To all whom it may concern:*

Be it known that I, CHARLES EDMUND KELLS, a citizen of the United States, residing at New Orleans, in the parish of Orleans and State of Louisiana, have invented certain new and useful Improvements in Water-Distilling Apparatus, of which the following is a specification.

This invention relates to apparatus for distilling water, particularly for the use of physicians, surgeons and dentists who generally require small quantities of freshly distilled water from day to day or for constant use.

It is important that water for such purposes should be distilled in apparatus consisting largely of glass in preference to metal as the distilled water is often used for injections and absolute purity is essential. Therefore, it is important that the water while being distilled and after the distillation should not come in contact with metal. Stills of the general class to which my invention relates, as commonly constructed, require constant watching in order that the water supply shall not fail because otherwise the glass flask, when such is employed, will be cracked, burned or broken by the heat of the burner unless the fuel supply is shut off.

In my applications for Patents No. 313,481 filed July 26, 1919 and No. 398,859 filed July 26, 1920, I have shown apparatus so constructed as to automatically shut off the fuel supply when the water supply fails or when the receiver for the distilled water is filled to the desired extent. The two above mentioned applications show different modifications of apparatus which may be used for this purpose and according to my present invention I have devised a new form of apparatus embodying certain improvements.

The improved apparatus is automatic in the control of the water supply and the supply of heating medium so that the proper amount of water is constantly provided for normally keeping the water in the flask at the proper level and the proper amount of heating medium is admitted to the burner for carrying on the operation, the apparatus being so constructed that should the water supply fail or become insufficient, the fuel supply will be at once automatically cut off so that breakage of any part of the apparatus from overheating is prevented, and the apparatus is also so constructed that at the time the fuel supply is cut off the water supply is also stopped.

It is also desirable that the distilled water should not be wasted and the improved apparatus is so constructed that the fuel supply and also the water supply is cut off and the distilling operation suspended when the desired amount of distilled water is obtained.

The drawing shows diagrammatically an apparatus employing my improvements.

A flask or still A is connected by a pipe B with a condenser C. The condenser delivers to a receiver D for distilled water and contains a coil E. These parts A, B, C, D and E are preferably made of glass for the reasons before stated.

Water enters the coil E through a pipe $e$ which may be connected to a tank or service pipe. After passing through the coil, the water leaves the condenser at $e'$ and passes into a tank or vessel F, the bottom of which is connected by a pipe $f$ with a flask A. An overflow pipe G is connected to the upper part of the tank F and empties into a balancing vessel H carried by the outer end of a lever K pivoted at $l$ to a suitable support L. The receiver D is detachably connected with the shorter arm of the lever. The vessel H is arranged directly under the outlet of the pipe G and it is provided with an overflow pipe $h$ which delivers to a sink M or other device for carrying off waste water. The position of the vessel H on the lever may be changed or adjusted in any suitable way. Normally the vessel H is filled with water and normally this vessel overbalances the receiver D when the latter is empty or not filled to a predetermined extent. An outlet $h'$ is formed in the bottom of the pipe $h$ and when the supply of water from the pipe G ceases, the water runs out of the vessel H and the receiver D overbalances said balancing vessel H.

The flask or still A is heated by a burner N supplied with fuel by a pipe O. A valve $o$ in the pipe O is normally held open by an arm P, which engages a lug $p$ on the lever K, but the arm P is weighted as indicated at $p'$ so that when the arm is disengaged from the lug the arm will turn and the valve will be closed. A valve r in the pipe e is normally held open by an arm r' which engages a lug r² on the lever K. The arm is weighted as indicated at r³ so that when the arm is disengaged from the lug, the arm will turn and the valve will be closed.

In starting the operation, the water supply is turned on and the water is conveyed by the pipe e through the condenser to the vessel F which it fills, and from this vessel the flask A is filled to the same level as the water in the vessel F. The supply of water to the vessel F is more than sufficient to supply the still and it overflows through the pipe G into the balancing vessel H which it fills to the top of the overflow. The supply is sufficient to normally provide an overflow through the pipe h which as will be observed is provided near the bottom of the vessel H with a port h' as shown.

The empty receiver D is supported on the lever K and the arms P and r' are made to engage the lugs p and r² on said lever. When so arranged, the water supply and the fuel supply are open and the distilling operation may proceed. It will be observed that the tank or vessel H holds the valves open when said vessel H is filled with water, but should the supply of water to this vessel fail or become unduly diminished, the tank will be drained through the exit opening h' which, of course, decreases the weight and, therefore, the receiver D whether empty or full overbalances the vessel H, and the lever K is turned in such manner as to release the weighted arms P and r' and the valves in the water supply and fuel supply pipes are automatically closed. The up and down movements of the lever K are limited by the stops x and z.

When distilled water to the desired amount has been obtained in the receiver D, the weight of the filled or partially filled receiver is sufficient to overcome the weight of the water filled vessel H, at which time the lever K is automatically moved to release the valves which are automatically closed.

By these means, the supply of water and fuel to the apparatus is controlled entirely by the receiver D which operates not only to shut off the fuel supply and water supply when the receiver is filled, but also when the water supply ceases. Of course it is not necessary to provide means for cutting off the water supply if the fuel supply fails, as no danger to the apparatus will be incident to the stoppage of the fuel supply, although it will be observed that the apparatus is so organized that should the water supply fail both the fuel supply and water supply are shut off.

I have shown my improvements embodied in apparatus shown, described and claimed in my above mentioned applications. The novel features of my present invention are set forth in the accompanying claims.

I claim as my invention:

1. A distilling apparatus, comprising a still, a burner for heating it, means for supplying fuel to the burner, a condenser connected with the still, a receiver for distilled water, means for supplying water to the still, a counterbalancing vessel associated with the receiver for distilled water, and means for conveying water from the water supply to said counterbalancing vessel.

2. Distilling apparatus, comprising a still, a burner for heating it, means for condensing the products of distillation, a receiver for distilled water, a valve controlled pipe for supplying fuel to the burner, means for supplying water to the still, a support for the receiver of distilled water, a counterbalancing vessel associated therewith, means for conveying water from the water supply to said counterbalancing vessel, and devices controlled by the weight of said counterbalancing vessel for shutting off the water supply.

3. Distilling apparatus, comprising a still, a burner for heating it, a condenser for the products of distillation, a valve controlled pipe supplying fuel to the burner, a water supply pipe, a vessel to which the water supply pipe delivers and which communicates with the still, a receiver for distilled water, a pivoted support for the receiver, a counterbalancing vessel connected with said support, means for conveying water from the water supply to said counter-balancing vessel, and means operated by the support of said receiver and said counter-balancing vessel for shutting off the fuel supply when the water supply fails or is diminished.

4. Distilling apparatus, comprising a still, a burner for heating it, a condenser associated with the still, a valve controlled fuel supply pipe, a receiver for the distilled water, a lever on which it is supported, a counterbalancing vessel supported by said lever, a valve controlled water supply pipe, means for conveying water therefrom to the still and to the counter-balancing vessel, and connections between the lever and the valve in the fuel supply pipe whereby the valves are closed when the water supply fails or the amount of distilled water is sufficient.

5. A distilling apparatus comprising a still, a water supply pipe, a still feeding tank connected with the still and to which the water supply pipe delivers, an overflow for said tank whereby the liquid in the still is maintained at a constant level, a condenser associated with the still, means for heating the still, a counterbalanced vessel, means for conveying undistilled water from the water supply to said counterbalanced vessel, means for normally maintaining a predetermined level in said counterbalanced vessel, means for draining said vessel, and means operated by the movement of the said vessel for shutting off the supply of heating medium when the water supply fails.

6. A distilling apparatus comprising a still, a water supply pipe, a still feeding tank connected with the still and to which the water supply pipe delivers, an overflow for said tank whereby the liquid in the still is maintained at a constant level, a condenser associated with the still, means for heating the still, a lever weighted at one end and carrying at the opposite end a water receiving vessel provided with an overflow and a drainage orifice, means for conveying undistilled water from the water supply to the water receiving vessel, and means operated when the water receiving vessel is emptied for shutting off the supply of the heating medium when the water supply fails.

In testimony whereof, I have hereunto subscribed my name.

CHARLES EDMUND KELLS.